US006988023B2

(12) United States Patent
Matsumoto et al.

(10) Patent No.: US 6,988,023 B2
(45) Date of Patent: Jan. 17, 2006

(54) MONITORING AND CONTROL SYSTEM

(75) Inventors: Tadashi Matsumoto, Tokyo (JP); Tomoo Ashizawa, Tokyo (JP); Mitsuru Mitani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 530 days.

(21) Appl. No.: 10/294,900

(22) Filed: Nov. 15, 2002

(65) Prior Publication Data

US 2003/0185150 A1 Oct. 2, 2003

(30) Foreign Application Priority Data

Mar. 29, 2002 (JP) .............................. 2002-096288

(51) Int. Cl.
H02J 1/14 (2006.01)

(52) U.S. Cl. .................................................. 700/286

(58) Field of Classification Search ................ 700/286, 700/291–294, 22, 297; 702/57–62; 370/216, 370/217, 221, 225
See application file for complete search history.

(56) References Cited

U.S. PATENT DOCUMENTS

| | | | | |
|---|---|---|---|---|
| 3,911,415 A | * | 10/1975 | Whyte | 340/310.03 |
| 4,146,749 A | * | 3/1979 | Pepping et al. | 370/217 |
| 4,881,220 A | * | 11/1989 | Yomogida et al. | 370/222 |
| 5,787,070 A | * | 7/1998 | Gupta et al. | 370/217 |
| 6,160,690 A | * | 12/2000 | Matsumoto et al. | 361/62 |
| 6,539,287 B1 | * | 3/2003 | Ashizawa | 700/292 |
| 2002/0064010 A1 | * | 5/2002 | Nelson et al. | 361/64 |
| 2003/0161084 A1 | * | 8/2003 | Potts et al. | 361/62 |

OTHER PUBLICATIONS

Sekine, T., "Synthetic Manual of Power Distribution Technology", Nov. 30, 1991, Published by OHM Company.

\* cited by examiner

*Primary Examiner*—Jayprakash N. Gandhi
*Assistant Examiner*—Chad Rapp
(74) *Attorney, Agent, or Firm*—Leydig, Voit & Mayer, Ltd.

(57) ABSTRACT

A monitoring and control system includes a center main system (209) installed in a sales office and a substitute center system (208). The monitoring and control system further includes a different substation terminal interconnection function that, in the case where there occurs an abnormality to a communication channel provided for each substation terminal and connects the substation terminal to the center main system (or the substitute center system), instructs a different substation terminal to perform the interconnection and communication with the center main system (or the substitute center system) instead of the substation terminal. With this construction, through the different substation terminal that received the instruction, the center main system monitors and controls a switch to be monitored by the substation terminal connected to the communication channel to which the abnormality occurs.

10 Claims, 17 Drawing Sheets

| EXPLANATION OF LEGENDS |
|---|
| —— ; DISTRIBUTION LINE |
| ○ ; DISTRIBUTION LINE SECTION SWITCH (NORMALLY CLOSED) |
| ɸ ; DISTRIBUTION LINE LOOP SWITCH (NORMALLY OPENED) |
| ----- ; COMMUNICATION CHANNEL BETWEEN CENTER AND SUBSTATION |
| ===== ; INTER-SUBSTATION COMMUNICATION CHANNEL |

EXPLANATION OF LEGENDS
— ; DISTRIBUTION LINE
O ; DISTRIBUTION LINE SECTION SWITCH (NORMALLY CLOSED)
ϕ ; DISTRIBUTION LINE LOOP SWITCH (NORMALLY OPENED)
----- ; COMMUNICATION CHANNEL BETWEEN CENTER AND SUBSTATION

MONITORING AND CONTROL SYSTEM

BACKGROUND OF THE INVENTION

1. Field of the Invention

The present invention relates to a monitoring and control system, and more specifically to a monitoring and control system for automatically monitoring and controlling monitoring and control targets spread out over a wide area, such as switches placed on distribution lines.

2. Description of Related Background Art

FIG. 14 is a drawing illustrating a case where a conventional monitoring and control system is applied to a power distribution automation system under the service area of a sales office. A center system 100 installed in the sales office exists at the center and a substation 1 to a substation 7 (or there exist more or less substations). 101 exist around the center system 100, a plurality of distribution lines 102 extend from each substation 101, normally closed distribution line section switches 104 are placed on respective distribution lines 102 as appropriate, and normally opened distribution line loop switches 103 that are interconnectable with other distribution lines 102 are placed at appropriate locations.

The sales office, in which the center system 100 is installed, is connected to each substation 101 by a communication line 105. Also, each substation 101 is connected to each of switches 103 and 104 by a communication line 102-1. The center system 100 collects information concerning the switches 103 and 104 and the substations 101 and controls equipment of the substations 101 or the switches 103 and 104 on the basis of the information.

FIG. 15 is a detailed explanatory drawing of an example of a construction of a monitoring and control system of this type shown in FIG. 14. In FIG. 15, reference numeral 1 denotes a center system, each of numerals 2-1 and 2—2 denotes a communication line between the center system 1 and a substation terminal 3-1 or 3-2, each of numerals 3-1 and 3-2 denotes the substation terminal, each of numerals 4-1, 4-2, and 4-3 denotes a communication line that extends from one of the substation terminals 3-1 and 3-2 and exchanges information with a switch terminal unit 5-1, 5-2, or 5-3. Each of reference numerals 5-1, 5-2, and 5-3 represents a switch terminal unit that is provided so as to correspond to one of switches 15-1, 15-2, and 15-3 and performs the monitoring and controlling of the switch. Reference numeral 10 denotes a power receiving line of each substation, numeral 11 denotes a main power distribution transformer, numeral 12 denotes a power distribution bus line of each substation, and numeral 13 denotes a feeder circuit breaker (hereinafter referred to as the "FCB"). Each of reference numerals 14-1, 14-2, and 14-3 denotes a distribution line, each of numerals 15-1 and 15-2 denotes a normally closed distribution line section switch that is placed on the distribution line, numeral 15-3 denotes a normally opened distribution line loop switch that is placed on the distribution line, each of numerals 15-4, 15-5, and 15-6 denotes a normally opened distribution line loop switch that is placed on the distribution line and is interconnectable with another distribution line.

An operation will be described. In FIG. 15, if a distribution line fault occurs to a certain section of the distribution line (to the distribution line 14-2, for instance), a protection relay installed in a substation starts its operation and trips the FCB 13, thereby placing the distribution line in a power failure state. At this point, information showing that the FCB 13 is opened, information showing that the protection relay starts its operation, information showing a fact that the distribution line detected by the switch terminal units 5-1, 5-2, and 5-3 is placed in a power failure state, and information showing how a fault current has passed are sent to the center system 1 through the substation terminal 3-1.

FIG. 16 is a drawing showing the flow of information from the center system 1 to the substation terminal 3-1 and the distribution line section switch by the terminal unit. FIG. 16 also shows the types of the information.

FIG. 17 shows a system construction where information in the center system 1 is backed up using a substitute center system. This system construction is, so to speak, a duplex system in which necessary processing is performed by the center system 1 in ordinary cases, but in the case where the center system is temporarily stopped due to a periodical inspection or the like, the center system 1 is switched to the substitute center system and the necessary processing is performed by the substitute center system.

Also, in this drawing, two channels (channel A and channel B) are used as the communication line between the sales office and the substation, so that the reliability is considerably enhanced. However, there are many cases where both of the communication lines A and B fall into a communication failure state at the same time. Representative examples of a factor that causes the breakdown of a communication line are a case where an underground communication line is cut during a road construction work or the like, a case where a communication line is cut by a working vehicle during a construction work in the vicinity of the communication line, and the like. As can be seen from this, there exist various factors causing such a breakdown, and surprisingly, there are many cases where both of the two channels are break down at the same time.

In FIG. 15, the center system 1 analyzes where a fault section is on the basis of the information sent and specifies the fault section. That is, the center system 1 comprehensively puts together the facts that: a fault current has passed through the switch terminal unit 5-1 and the switch terminal unit 5-1 is placed in a power failure state; no fault current has passed through the switch terminal unit 5-2 but this switch terminal unit 5-2 is also placed in a power failure state; the switch terminal unit 5-3 detects that a power failure has occurred at one end thereof and the other end thereof is in a voltage sound state; the substation FCB 13 is opened on the basis of these information; and a protection relay for the distribution line starts its operation. As a result, the center system 1 judges that a section 14-2 is the fault section.

When a fault section is specified, the center system 1 checks whether there exists any sound (fault-free) power failure section of the distribution line. In this case, the section 14-3 is such a power failure section. If there exists any sound power failure section, a switch adjacent to the fault section is turned on and locked, the FCB 13 is turned on to transmit power to a side closer to a power source than the fault section, and it is checked whether a distribution line interconnection switch exists on a side closer to a load than the fault section. If the judgment result is positive, the interconnection switch is turned on to transmit power to the load-side sound power failure section in the fault section.

The conventional system is constructed and operated in the manner described above. Therefore, there occurs a problem that it becomes impossible to perform automatic monitoring and control in the case where a communication line that realizes communication between a sales office and a substation is broken down or in the case where the center system is downed.

SUMMARY OF THE INVENTION

The present invention has been made to solve this problem and the object of the present invention is to provide a monitoring and control system that performs monitoring and controlling with high reliability.

The monitoring and control system of the present invention includes a center main system that monitors and controls at least one substation, a distribution line connected to the substation, a switch provided on the distribution line, and a substation terminal that is provided for the substation and performs monitoring and control of the switch. The monitoring and control system comprises different substation terminal interconnection means that is provided for each substation terminal and, if an abnormality occurs to a communication channel that connects the substation terminal to the center main system, performs switching of communication channels so that a different substation terminal performs interconnection and communication with the center main system instead of the substation terminal. The center main system monitors and controls the switch that is a monitoring target of the substation terminal connected to the communication channel, to which the abnormality occurs, through the different substation terminal to which the interconnection and communication has been switched. Therefore, With this construction, it becomes possible to perform monitoring and control with high reliability.

DETAILED DESCRIPTION OF THE PREFERRED EMBODIMENTS

First Embodiment

Figure 1:
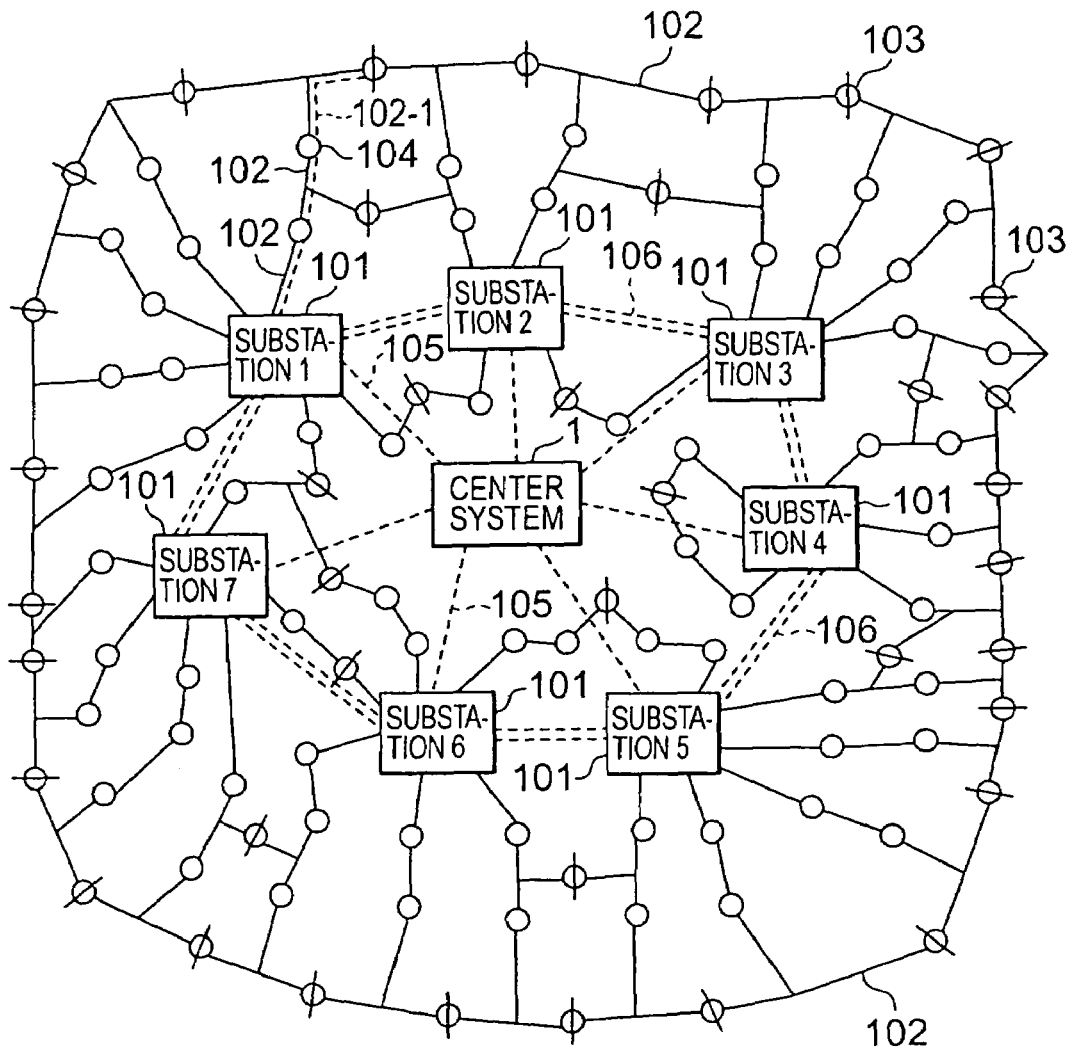
FIG. 1 is a drawing showing an overall construction of a monitoring and control system according to the first embodiment of the present invention and its periphery.
Figure 14:
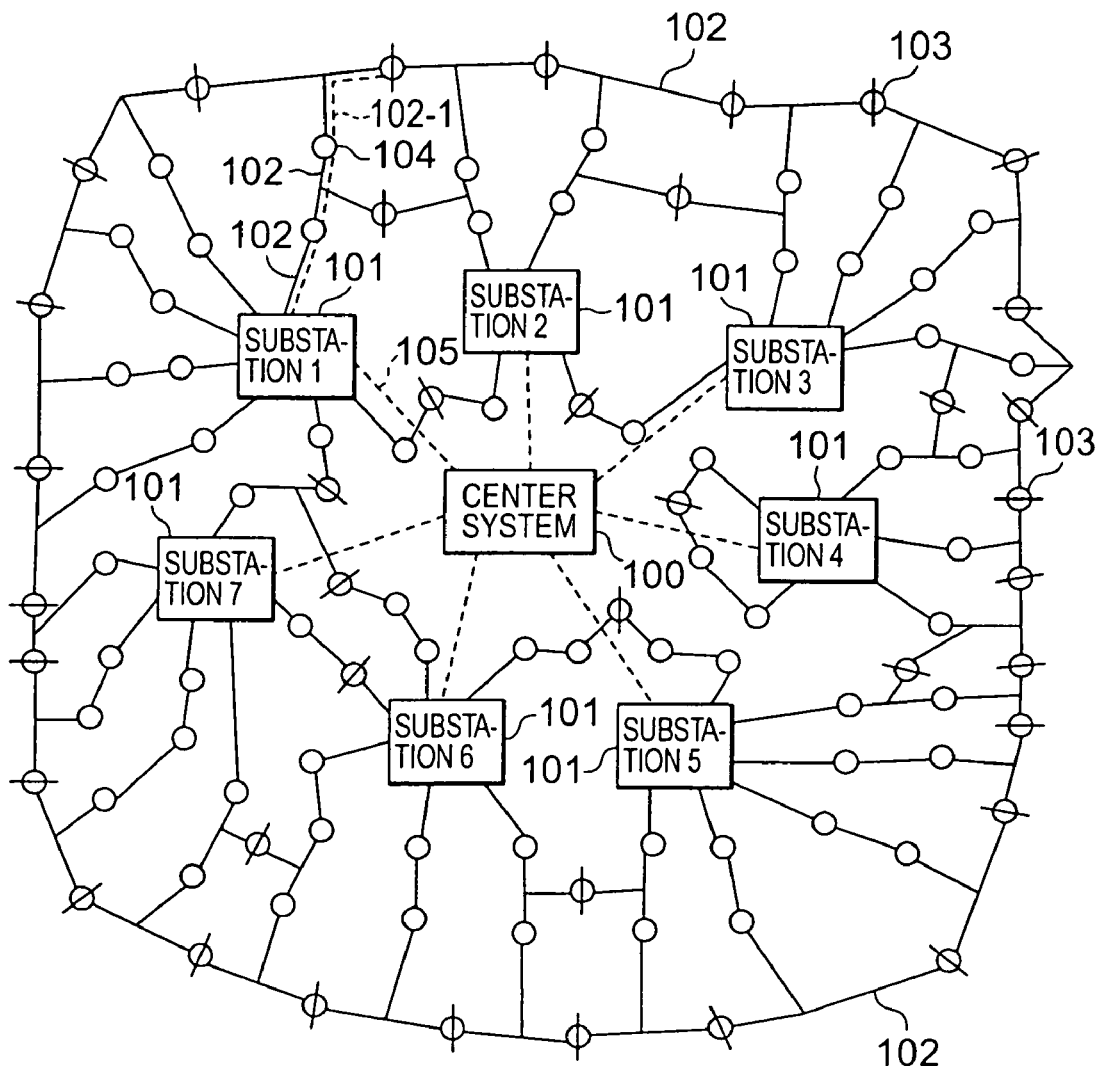
FIG. 14 is a drawing showing a target system of a conventional monitoring and control system.

FIG. 1 explains an outline of a monitoring and control system according to a first embodiment of the present invention. Note that the following embodiments will be described by taking a power distribution automation system as an example. In FIG. 1, a communication line 106 indicated using a double dotted line is provided between each substation 101. Other constructions are the same as those in FIG. 14, so that they are shown using the same reference symbols and are not described here. In this embodiment, it does not matter whether each communication line includes a signal channel or two (or more) channels. That is, there is imposed no specific limitation on the number of channels of each communication line.

Figure 2:
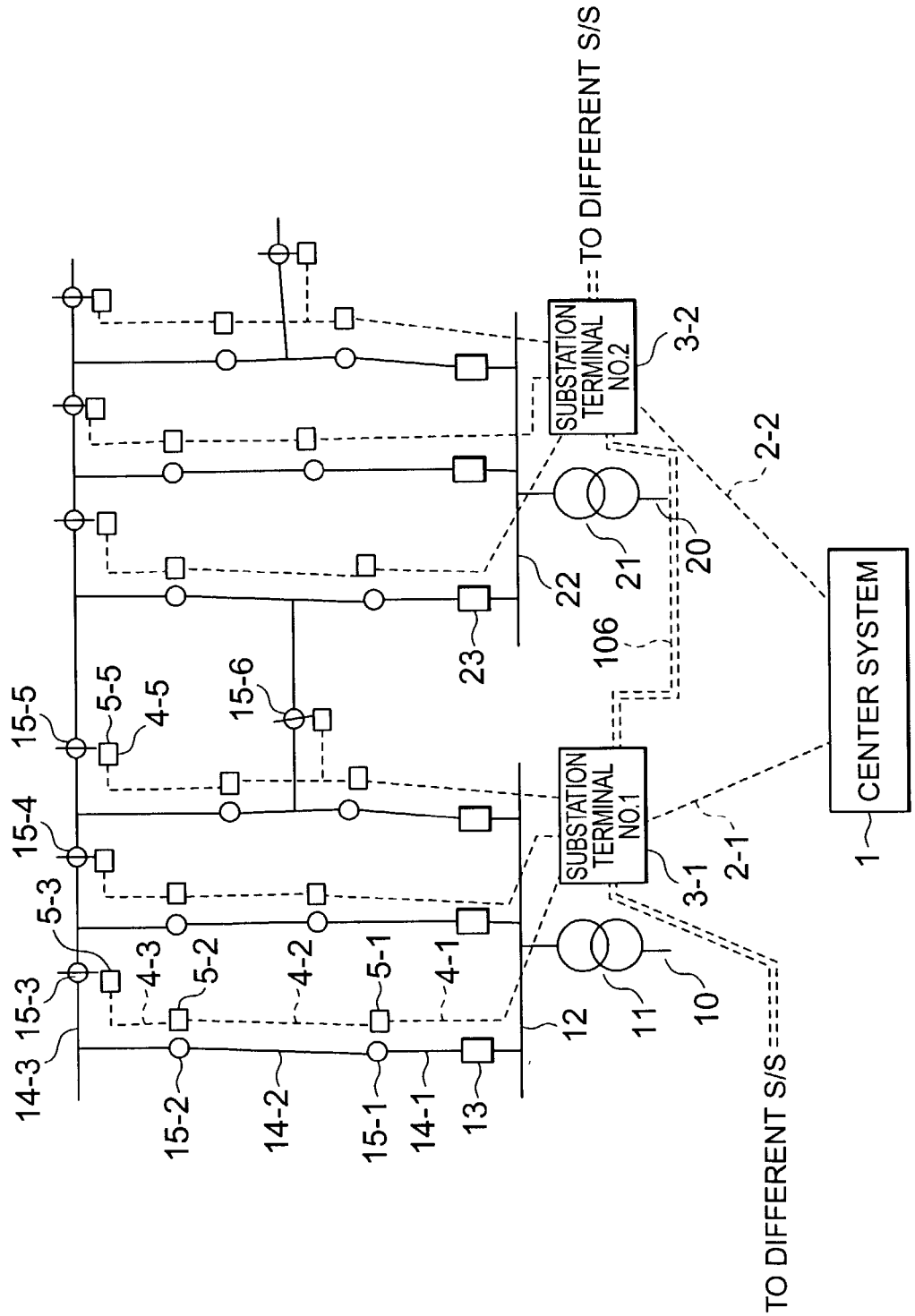
FIG. 2 is a detailed drawing showing a partial construction of the monitoring and control system according to the first embodiment of the present invention.
Figure 15:
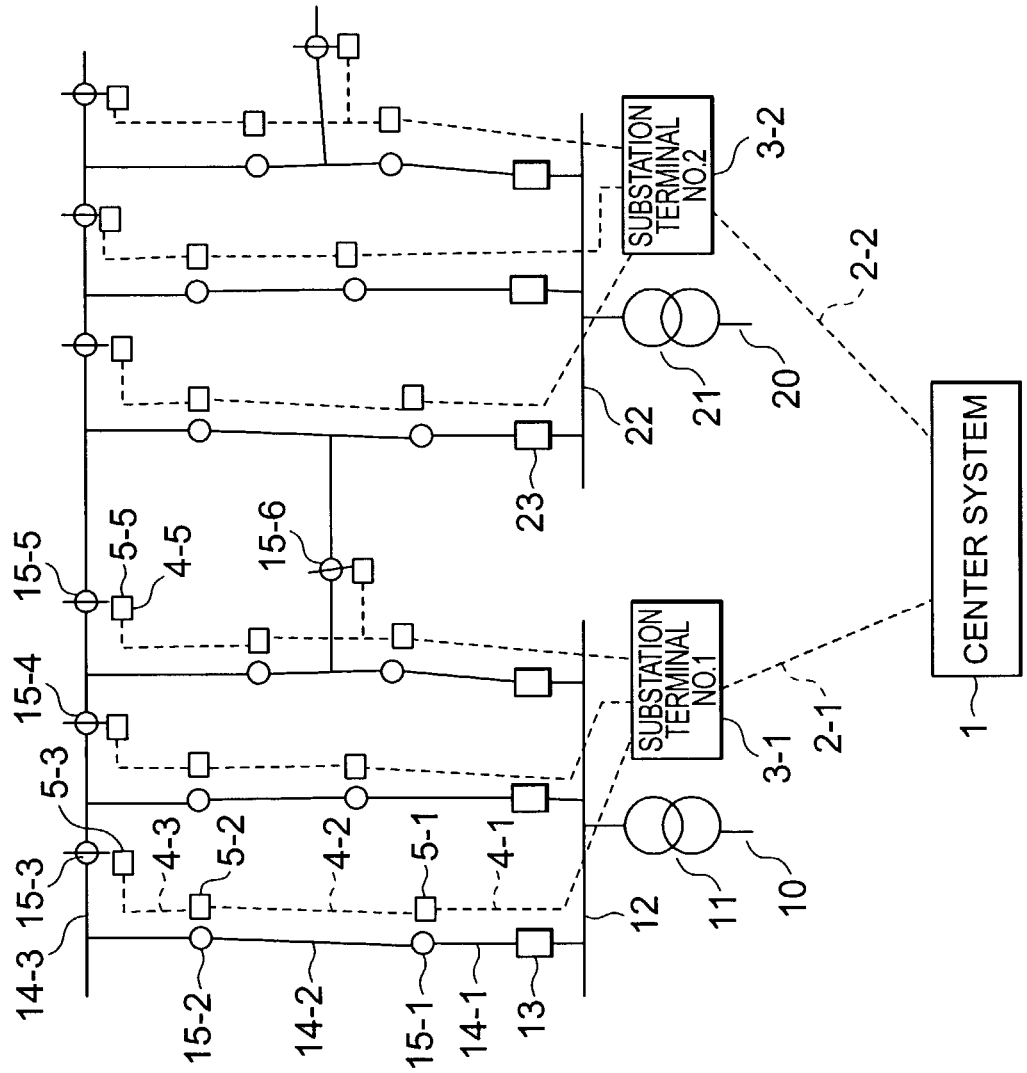
FIG. 15 is a construction drawing showing the details of the conventional monitoring and control system.

FIG. 2 is a drawing showing communication lines between the substation terminals 3-1 and 3-2. The construction in FIG. 2 is fundamentally the same as the construction in FIG. 15 described above, although there exists a difference that the communication line 106 indicated by a double dotted line is provided between the substation terminals 3-1 and 3-2. In FIG. 2, in the case where there occurs no abnormality to a communication line between a sales office, in which the center system 1 is provided, and substations in which the substation terminals 3-1 and 3-2 are provided, if the center system 1 operates normally, the processing performed to cope with a fault occurring to a distribution line is the same as that in FIG. 15, so that the detailed description thereof is not given here.

Figure 3:
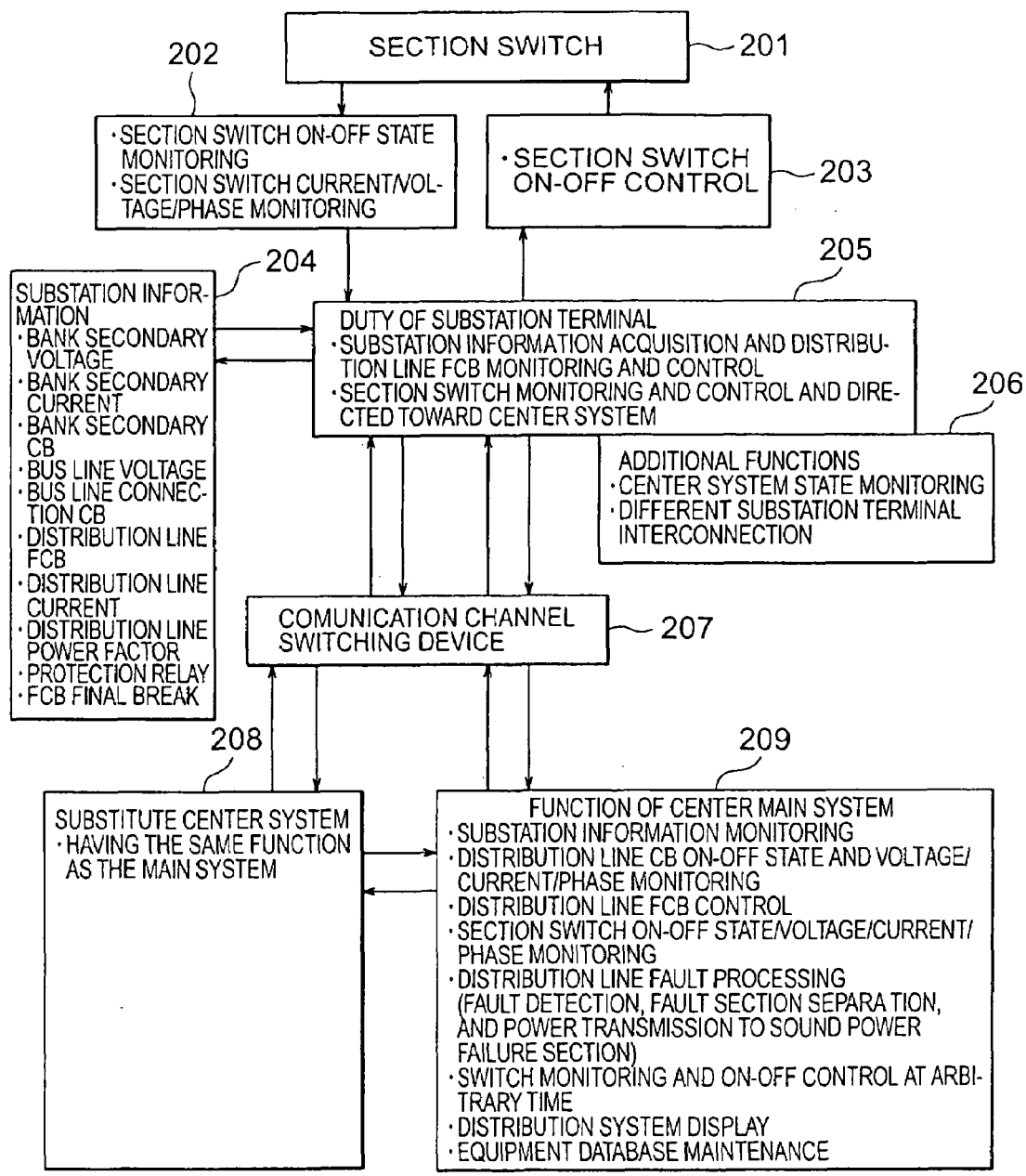
FIG. 3 is an explanatory drawing showing the flow of data in the construction of the monitoring and control system according to the first embodiment of the present invention.
Figure 16:
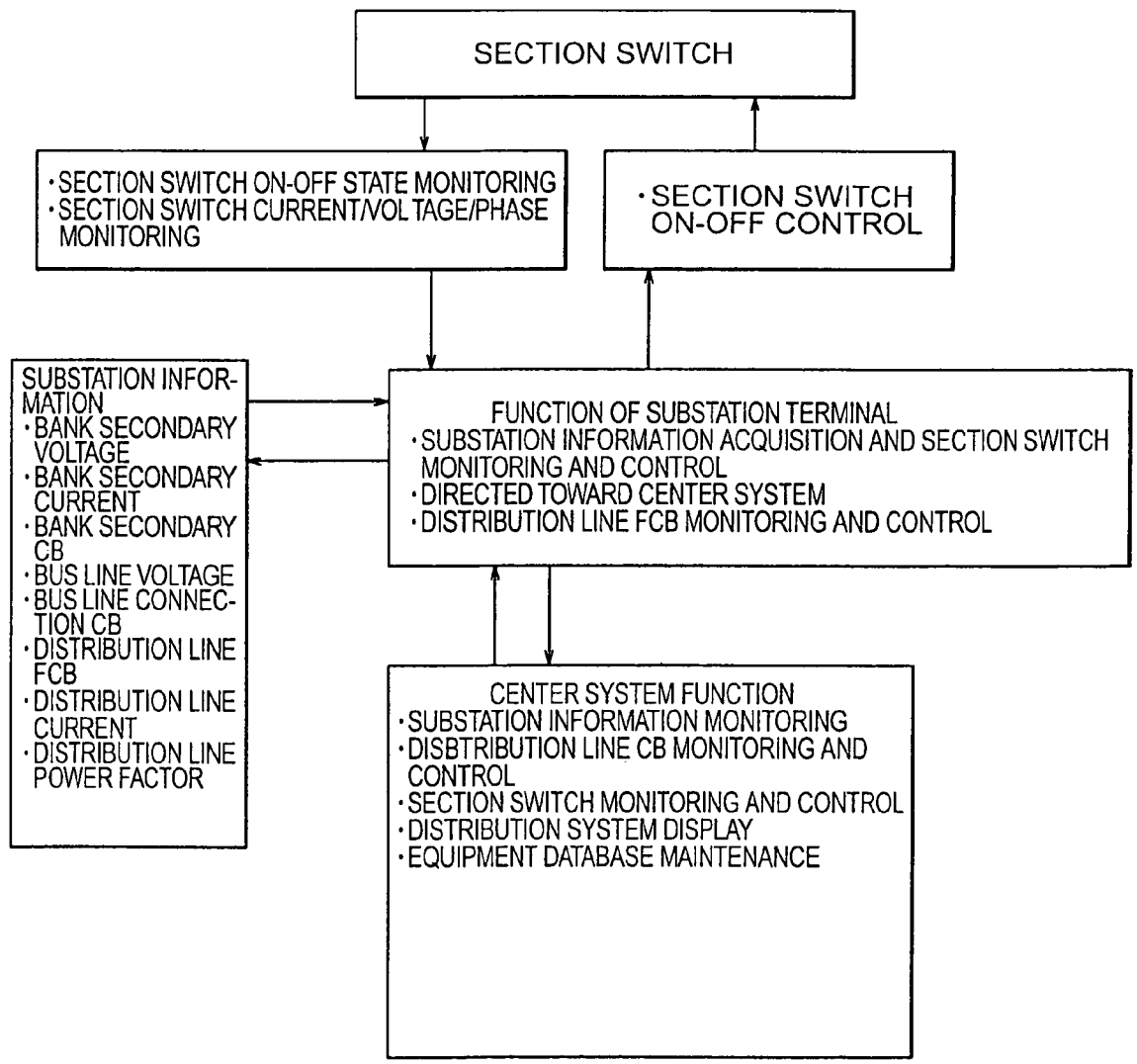
FIG. 16 is an explanatory drawing showing the flow of data in the conventional monitoring and control system.

FIG. 3 shows the flow of information between respective bases from the center system 1 to the substation terminal 3-1 and the section switch of the distribution line. FIG. 3 also shows the types of the information. A point, in which FIG. 3 greatly differs from FIG. 16, is that additional functions 206 are added to duties 205 of the substation terminal. These additional functions consist of a function of monitoring the state of the center system 1 from the substation terminal 3-1 and a function of establishing interconnection with a different substation terminal. That is, if an abnormality occurs to a communication line between a corresponding substation and the sales office in the flow of the information, the monitoring and control system according to this embodiment switches between the substation terminals 3-1 and 3-2 so that it becomes possible to establish interconnection of information between an adjacent substation terminal and the sales office, thereby monitoring and controlling the section switch (different substation terminal interconnection means).

It should be noted here that in FIG. 3, reference numeral 201 denotes a section switch, numeral 202 a section switch on-off state monitoring and a section switch current/voltage/phase monitoring, numeral 203 denotes section switch on-off control, numeral 204 denotes substation information (a bank secondary voltage, a bank secondary current, a bank secondary CB, a bus line voltage, a bus line connection CB, a distribution line CB, a distribution line current, a distribution line power factor, a protection relay, an FCB final break), numeral 205 denotes duties of the substation terminal (substation information acquisition, distribution line CB monitoring and control, section switch monitoring and control, and center system direction), numeral 206 denotes the additional functions (center system state monitoring and different substation terminal interconnection), numeral 207 denotes a communication channel switching device, numeral 208 denotes an substitute center system (having the same function as a center main system 209), numeral 209 denotes the functions of the center main system (substation information monitoring, distribution line CB on-off state and voltage/current/phase monitoring, distribution line CB monitoring, section switch on-off state/voltage/current/phase monitoring, distribution line fault processing (fault detection, fault section separation, and power transmission to sound power failure section), monitoring and on-off control of the switch at arbitrary times, power distribution system display, and equipment database maintenance). The center main system 209 performs the monitoring and control of the substation, the distribution line, the switch, and the substation terminal, while the substitute center system 208 performs the monitoring and control of the substation, the distribution line, the switch, and the substation terminal in place of the center main system 209 in the case where the center main system 209 is stopped due to a periodical inspection, a breakdown, or the like. Note that in this specification, each embodiment will be described by taking, as an example, a case where the center system 1 is constructed from both of the center main system and the substitute center system, although the present invention is not limited to this and the center system 1 may be constructed only from either one of them.

Figure 4:
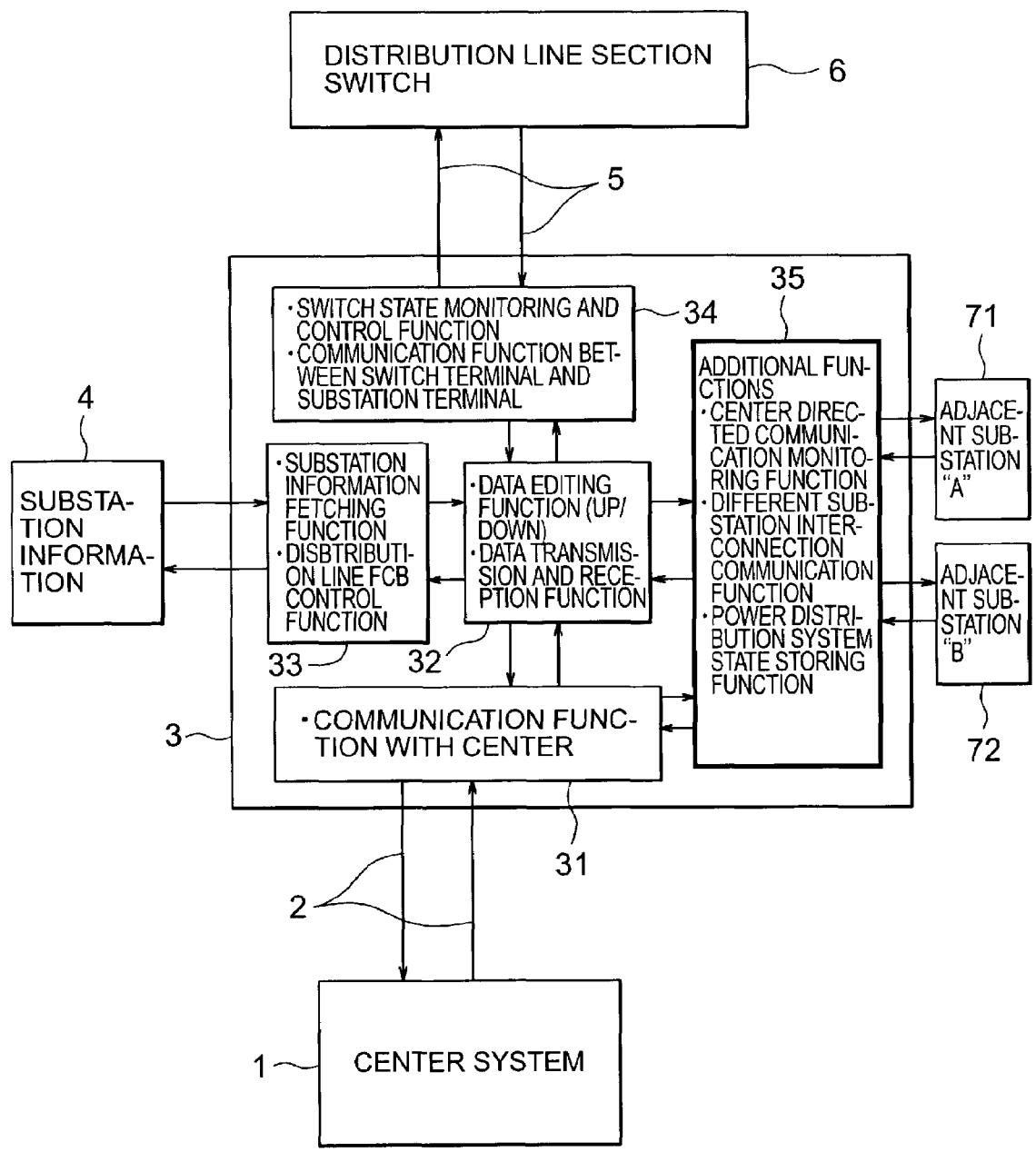
FIG. 4 is an explanatory drawing showing a functional drawing in the case where a different substation interconnection of a monitoring and control system according to a second embodiment of the present invention is embedded into a substation terminal.

FIG. 4 is a detailed explanatory drawing of FIG. 3. In FIG. 4, reference numeral 1 denotes a center system and numeral 2 represents a communication channel for performing communication between the sales office (center system 1) and the substation. Reference numeral 3 denotes a substation terminal and shows target functions 31 to 35 at the following substation terminals. Reference numeral 31 denotes a portion having a communication function of performing communication with the center system 1, numeral 32 denotes a portion having data transmission-reception function, which performs the exchange of monitoring and control information in the substation and monitoring and control information of the distribution line section switch, and a data editing function of performing data editing (up/down) of the information, numeral 33 denotes a portion having a substation information fetching function and a distribution line CB control function, numeral 34 denotes a portion having a switch state monitoring and control function of performing information exchange with a distribution line section switch and a function of performing communication between the switch terminal unit and the substation terminal, and numeral 35 denotes a portion having functions that are added to the substation terminal. The additional function portion has a function of monitoring the state of communication directed toward the center that has a function of monitoring the communication state of the sales office 2 under the interconnection with the communication function portion 31, an interconnection communication function with a different substation terminal, and a power distribution system state storing function. That is, the additional functions temporarily realize the functions of the center system 1. Reference numeral 4 denotes a required information portion of the substation, numeral 5 denotes communication lines that perform communication with a distribution line section switch 6, and numeral 6 denotes the distribution line section switch that is to be monitored and controlled and performs the exchange of information with a switch terminal unit in ordinary cases. Reference numerals 71 and 72 represent substation terminals of adjacent substations.

In FIG. 4, when the communication function portion 31 with the center system 1 detects a communication abnormality, the additional function portion 35 receives information showing this state, the different substation interconnection communication function portion (different substation terminal interconnection means) within the additional function portion 35 starts its operation, and the communication lines are switched so that an adjacent different substation terminal performs interconnection communication with the center system 1 (for information about the switching operation, see the fourth embodiment to be described later). The additional function portion 35 receives data concerning a power distribution system from the data editing function portion 32 at all times, holds the data in the power distribution system state storing function portion within the additional function portion 35, and updates the state in a real-time manner.

When the interconnection to the adjacent substation is finished, the center system 1 installed in the sales office monitors and controls, through the different substation, the distribution line section switch 6. In FIG. 4, it is assumed that whether the substation "A" 71 side or the substation "B" 72 side is used is initially set at the center system 1. For instance, if the processing load on the substation "A" 71 side is lighter than that of the substation "B" 72 side, the "A" 71 side is set so as to be used, the connection order is simply and uniquely determined in the ascending numeric order, or the like.

Figure 5:
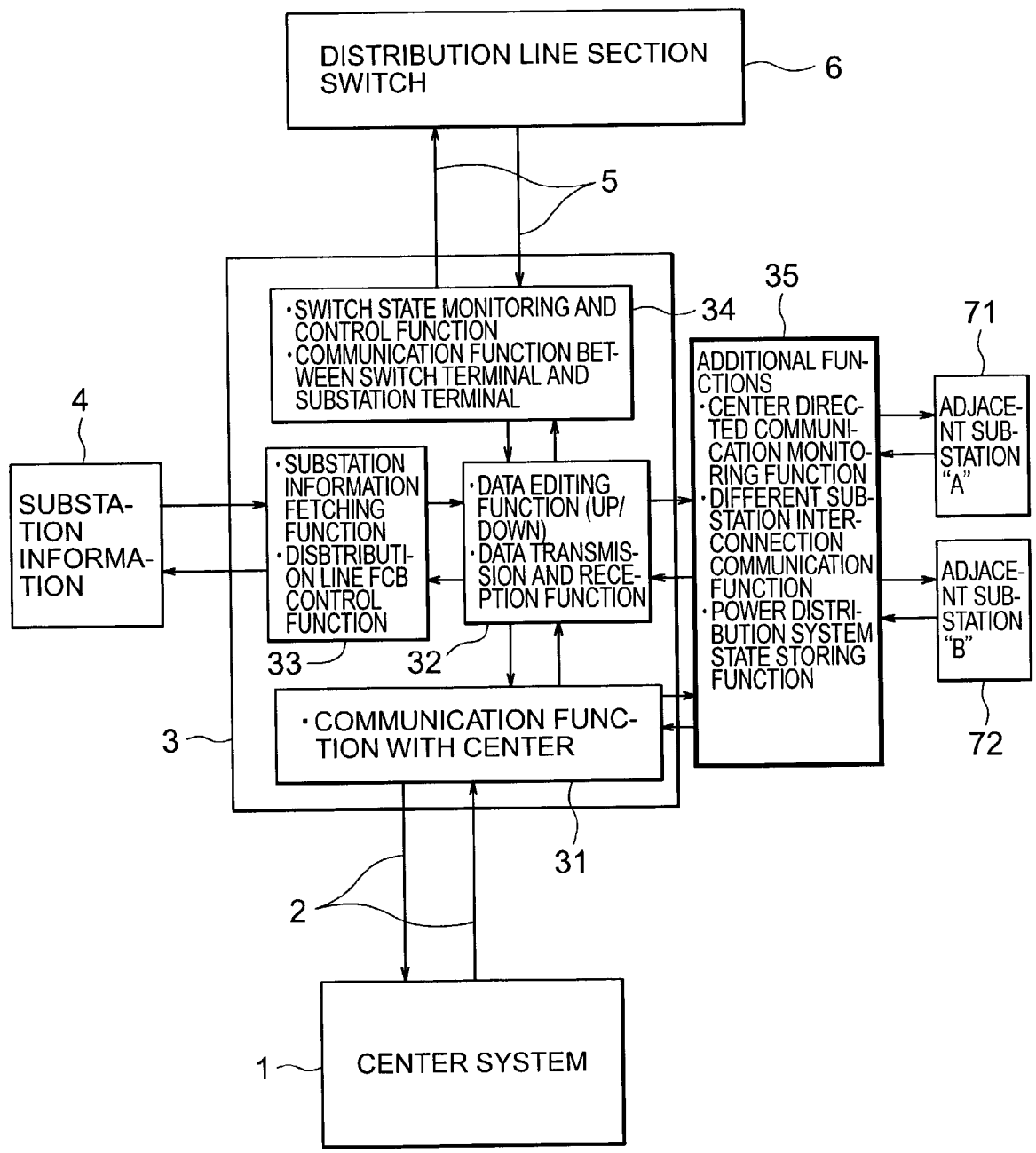
FIG. 5 is an explanatory drawing showing a functional drawing in the case where a different substation interconnection of a monitoring and control system according to a third embodiment of the present invention is placed separately from a substation terminal.

FIG. 5 is a drawing showing a modification of the first embodiment. FIG. 5 shows a case where additional function 35 of the substation terminal are structurally added to the outside of the substation terminal 3 (that is, the additional functions 35 are used after being constructed and connected as a separate body). Therefore, FIG. 5 is completely the same as FIG. 4 from the viewpoint of functions. For instance, when the system of the substation terminal 3 is of a conventional type at the time when the terminal 3 is delivered, the system is modified at a later date for the sake of improving its functions. In the case where the external additional functions 35 will be added afterward as shown in FIG. 5 to obtain the same system as in FIG. 4, the construction in FIG. 5 is used.

As described above, in this embodiment, information interconnection is established between substation terminals at all times. As a result, even if an abnormality occurs to communication between a substation and the center system, the communication is performed between an adjacent different substation terminal and the center system, which makes it possible to perform processing for coping with a fault occurring to a distribution line in a substation area in which the communication abnormality with the center system occurs, to realize a situation where there occurs no deterioration in the service to each consumer even in the substation area in which there occurs the communication abnormality with the center system, and to improve the reliability of the monitoring and control system.

Also, in the case where the additional function 35 portion is embedded into the substation terminal 3 as shown in FIG. 4, there is obtained an effect that it becomes possible to suppress a space and to easily perform installation in a limited space of an existing substation.

Also, in the case where the additional function 35 portion is provided and placed separately from the substation terminal 3 as shown in FIG. 5, there is obtained a construction where it is possible to separately operate the different substation interconnection communication function of the additional functions 35 even in the case where an abnormality occurs to the substation terminal 3. With this construction, it becomes possible to further enhance the reliability.

Second Embodiment

Figure 6:
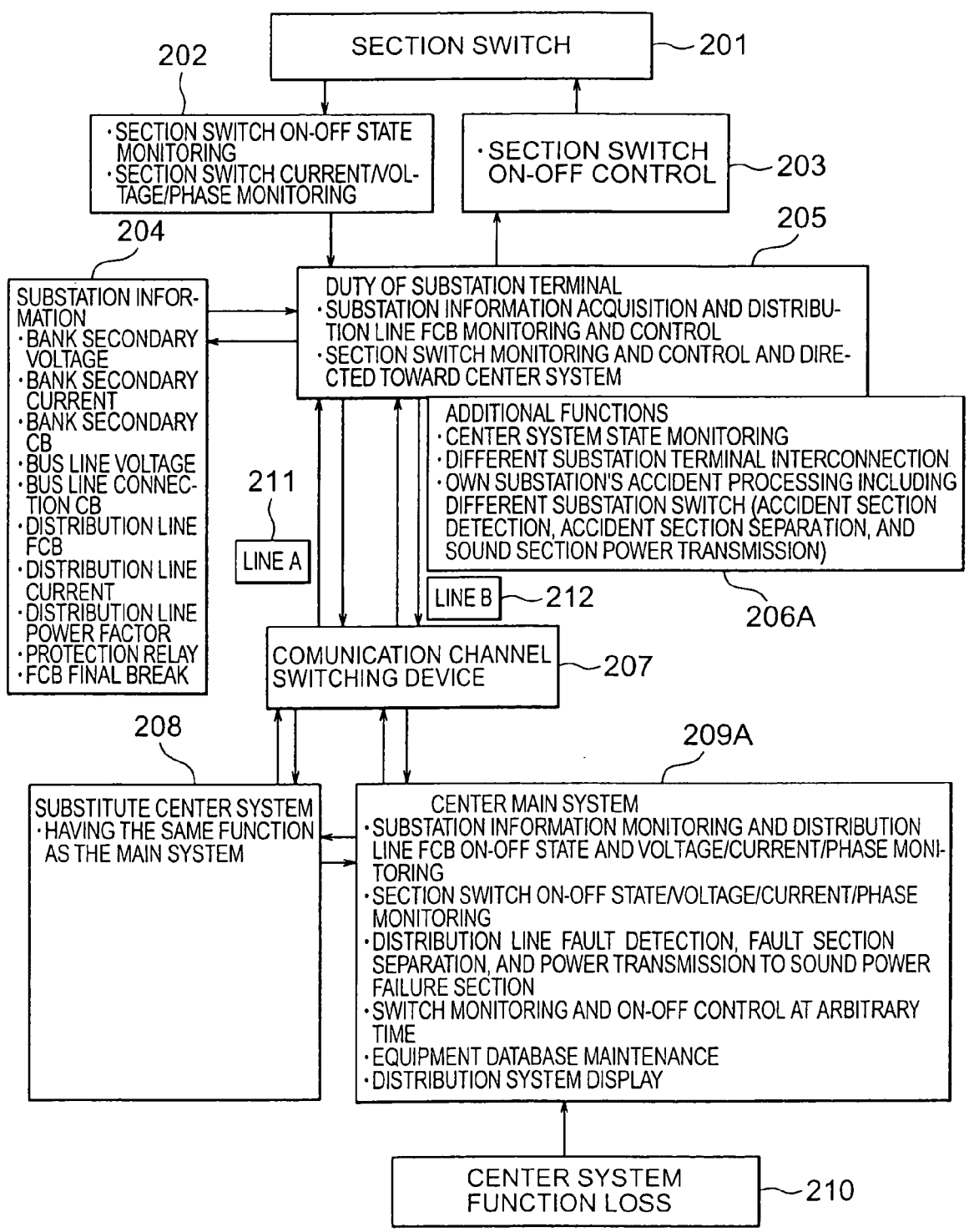
FIG. 6 is an explanatory drawing showing the flow of data in the case where, into a substation terminal, there is embedded a function of performing fault processing on a substation terminal side when there occurs an abnormality to a main system and an substitute system on a center side of a monitoring and control system according to a fourth embodiment of the present invention.

FIG. 6 shows the construction of a monitoring and control system according to a second embodiment of the present invention. In this embodiment, two channels (channels A211 and B212) are provided as a communication line. In this drawing, reference numeral 206A denotes additional functions, although a difference between the additional functions 206 in FIG. 3 is that an own substation's fault processing function portion (fault section detection, fault section separation, and sound section power transmission) including to a different substation interconnection switch is added that performs the processing for coping with a distribution line fault occurring at a different substation as well as at an own substation. As described above, in FIG. 6, the additional functions of the substation terminal are improved and, in the case where both of the two channels (A channel 211 and B channel 212) fall into an abnormal state during communication between the substation and the center system, data in a power distribution area corresponding to adjacent substations is stored in each substation and the processing for coping with a distribution line fault occurring at a different substation is carried out using the functions added to the substation terminal. Also, in FIG. 6, reference numeral 210 indicates the center system function loss. Other constructions are the same as those in FIG. 5 and therefore the description of the constructions is not given here.

That is, in this embodiment, in FIG. 6, the additional function portion is given a function with which interconnection switch information concerning an own substation area is stored in addition to information concerning different substation areas. Here, fault section detection, fault section separation, and power transmission to a power failure sound section are performed concurrently with the information storing.

Figure 7:
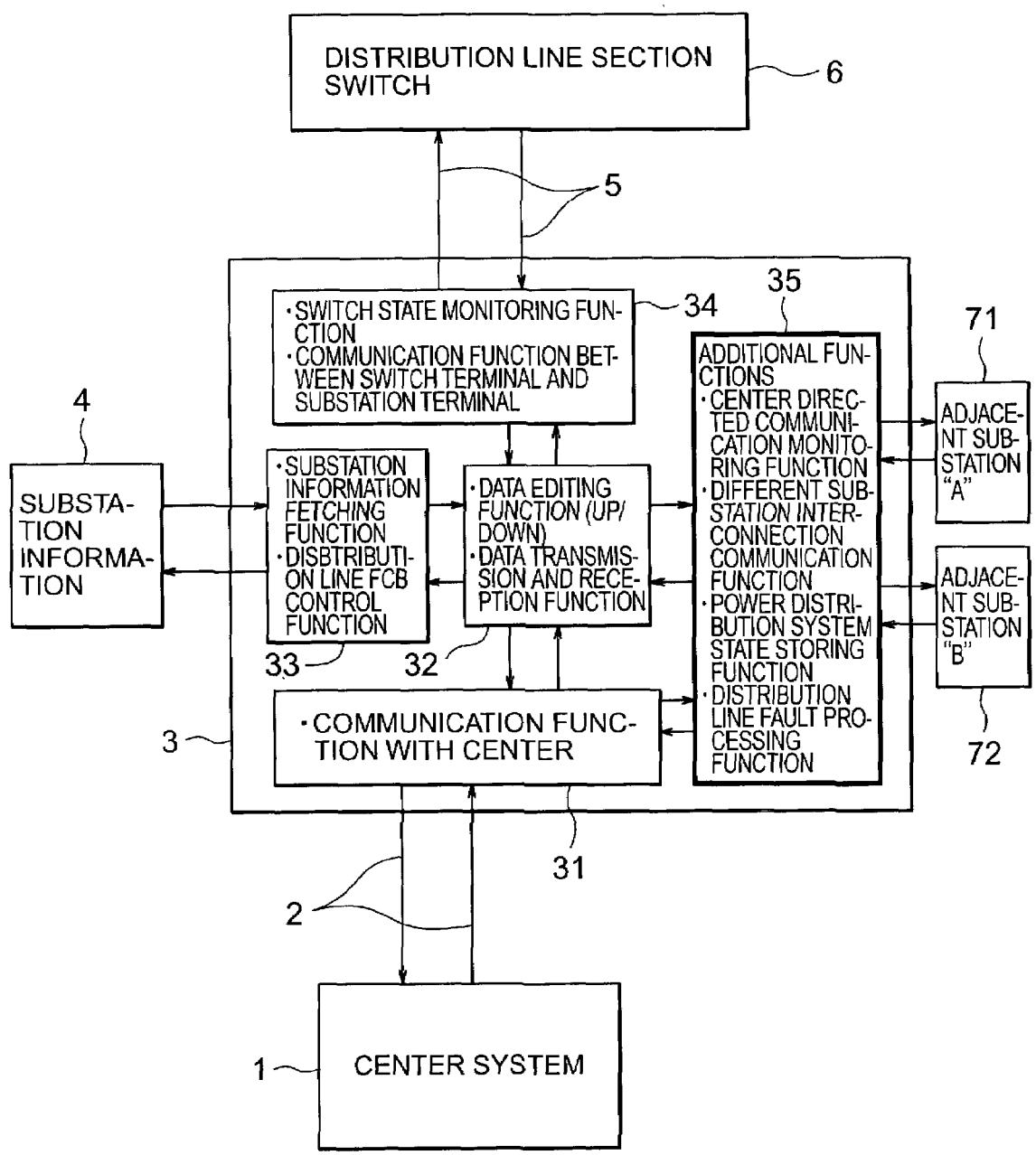
FIG. 7 is an explanatory drawing showing a functional construction where, into the substation terminal, there is embedded a function of performing fault processing on the substation terminal side when there occurs an abnormality to the main system and the substitute system on the center side of the monitoring and control system according to the fourth embodiment of the present invention.

FIG. 7 is an explanatory drawing of FIG. 6. In this drawing, the additional functions 35 include a distribution line fault processing function in addition to the additional functions 35 in FIG. 4. In a memory portion of this function, there are installed distribution line data, substation data, and software for performing the fault processing function, which means that the functions are improved in comparison with the case shown in FIG. 4. As described above, a difference between the construction shown in this drawing and that shown in FIG. 4 is the additional function 35 portion and other constructions are the same, so that the description of the same constructions is not given here.

It does not matter whether the additional function 35 portion in FIG. 7 is constructed by producing a computer using a specialized board or using a commercially available computer, so long as the additional functions come into play.

Figure 8:
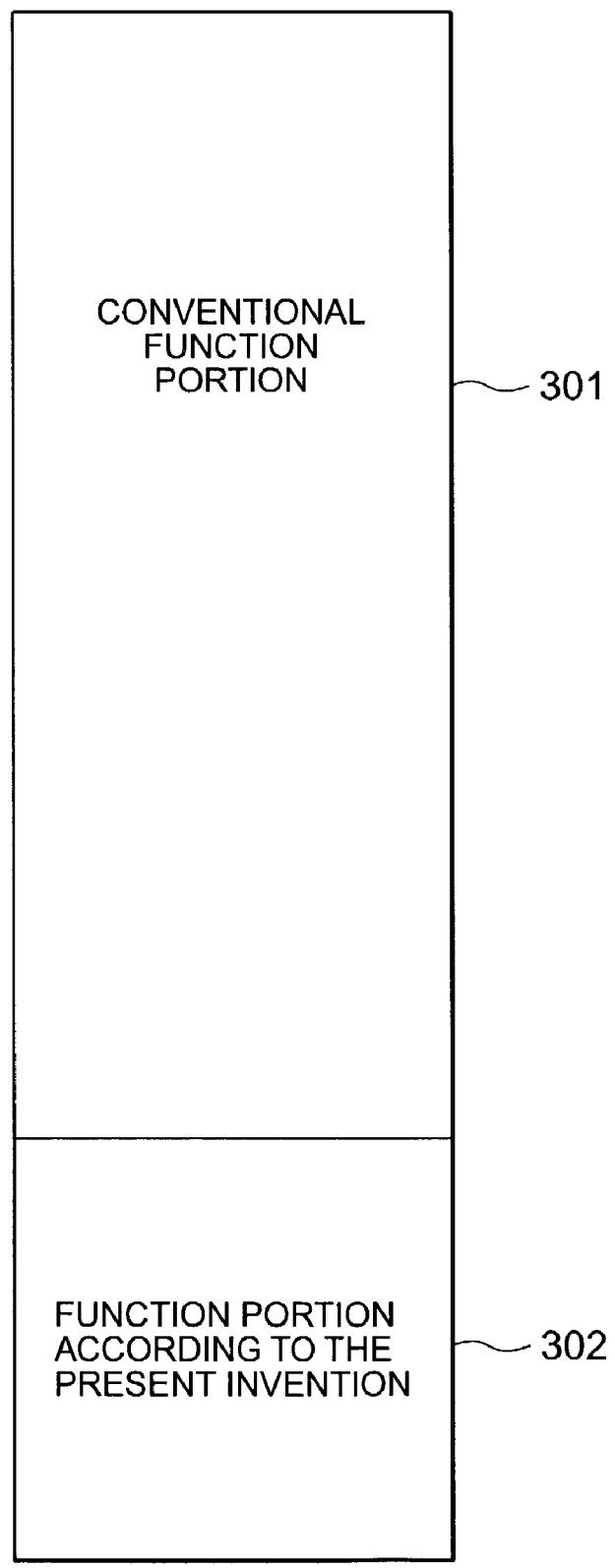
FIG. 8 is an outside drawing showing a construction where, into the substation terminal, there is embedded a function of performing fault processing on the substation terminal side when there occurs an abnormality to the main system and the substitute system on the center side of the monitoring and control system according to the fourth embodiment of the present invention.

FIG. 8 shows the external construction of the substation terminal 3 according to the present invention. In FIG. 8, a conventional function portion 301 including the center main system 209 is separated from a function portion 302 according to the present invention including the additional functions 35.

In FIG. 8, there is shown a construction where the function portion 302 according to the present invention is separated from the conventional function portion 301. However, the present invention is not limited to this and the function portion 302 according to the present invention may be embedded into the conventional function portion 301. It is possible to obtain the same effect even in this case.

As described above, in this embodiment, each substation terminal is further provided with the fault processing function that stores information concerning a monitoring target switch of its own substation and information concerning a monitoring target switch of a different substation and performs the processing for coping with a distribution line fault occurring at the different substation instead of the different substation in the case where an abnormality occurs to a communication channel that connects the different substation terminal and the center main system (or the substitute center system) or in the case where the center main system (or the substitute center system) is downed. With this construction, it becomes possible to further improve the reliability.

Third Embodiment

Figure 9:
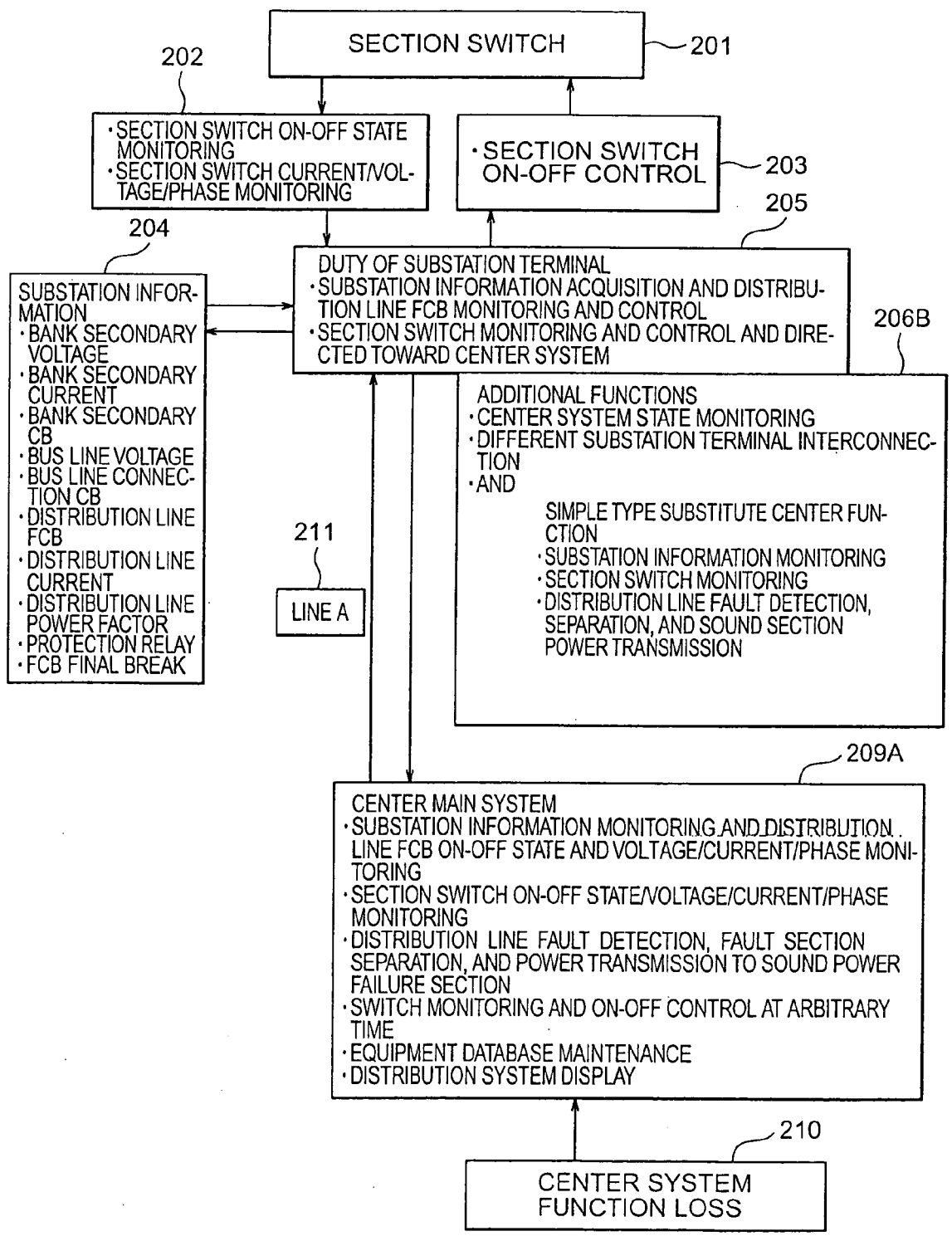
FIG. 9 is an explanatory drawing showing the flow of data in the case where, into a substation terminal, there is embedded a function of performing fault processing on a substation terminal side when there occurs an abnormality to communication between a substation and a main system, substitute system, and center on a center side of a monitoring and control system according to a fifth embodiment of the present invention.
Figure 17:
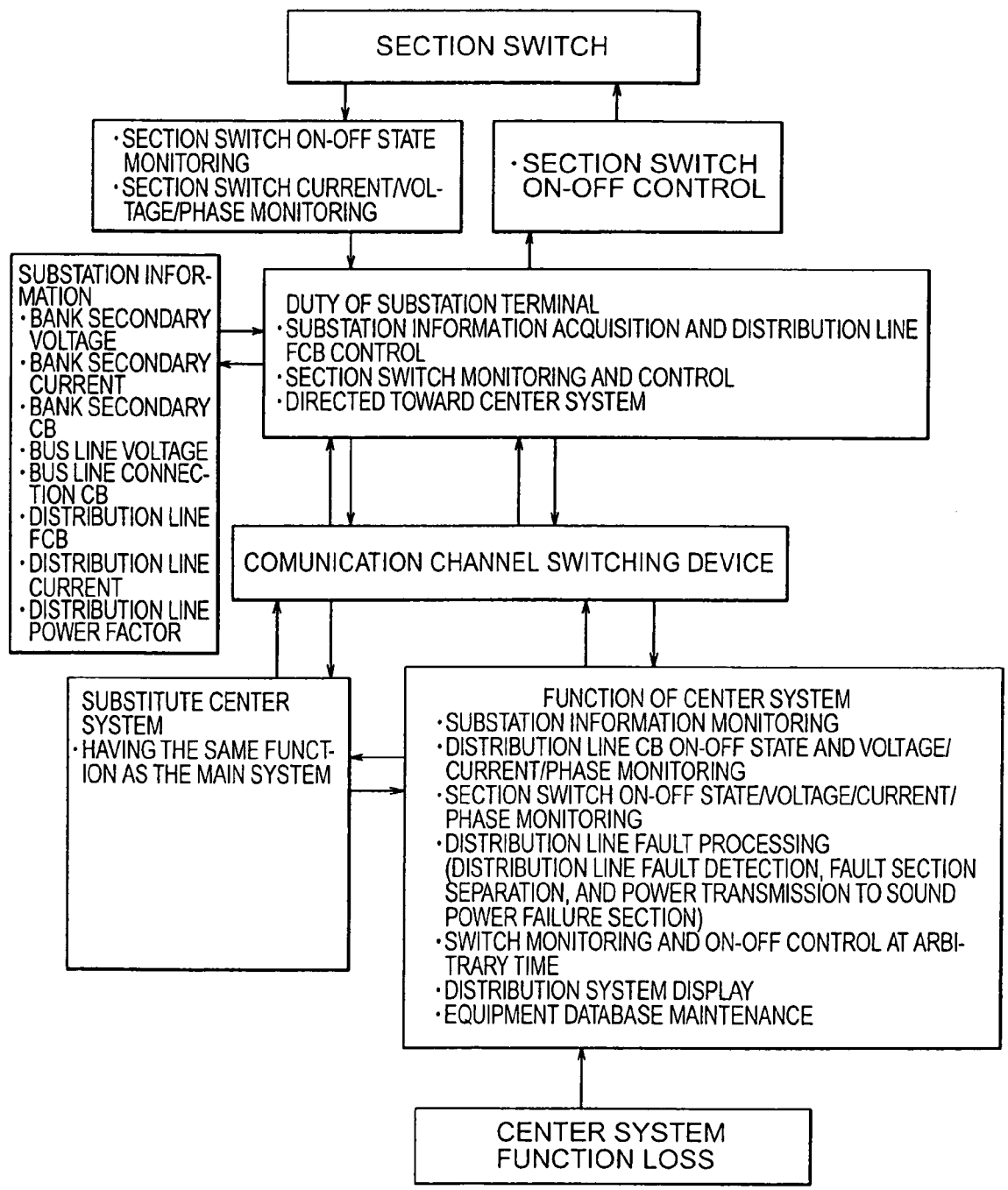
FIG. 17 is an explanatory drawing showing the functional construction of the conventional monitoring and control system.

FIG. 9 shows an embodiment of a construction in which the additional function portion is separated from the conventional function portion as a "simple type substitute center function". That is, in this embodiment, as shown in FIG. 9, a substitute center system 208 and a center main system 209 originally include additional functions 206B as the simple type substitute center function in addition to the additional functions 206 shown in FIG. 3. That is, there are added three functions: a substation information monitoring function; a section switch monitoring function; and a distribution line fault detection/separation/sound section power transmission function. This system has various features. For instance, in the case where the additional functions 206 of the present invention are added to the conventional function shown in FIG. 17, it becomes possible to cope with this construction by modifying the conventional function portion (see reference numeral 301 in FIG. 8) to a small extent and to realize a sophisticated function by suppressing limitations on the conventional function to the minimum level.

Figure 10:
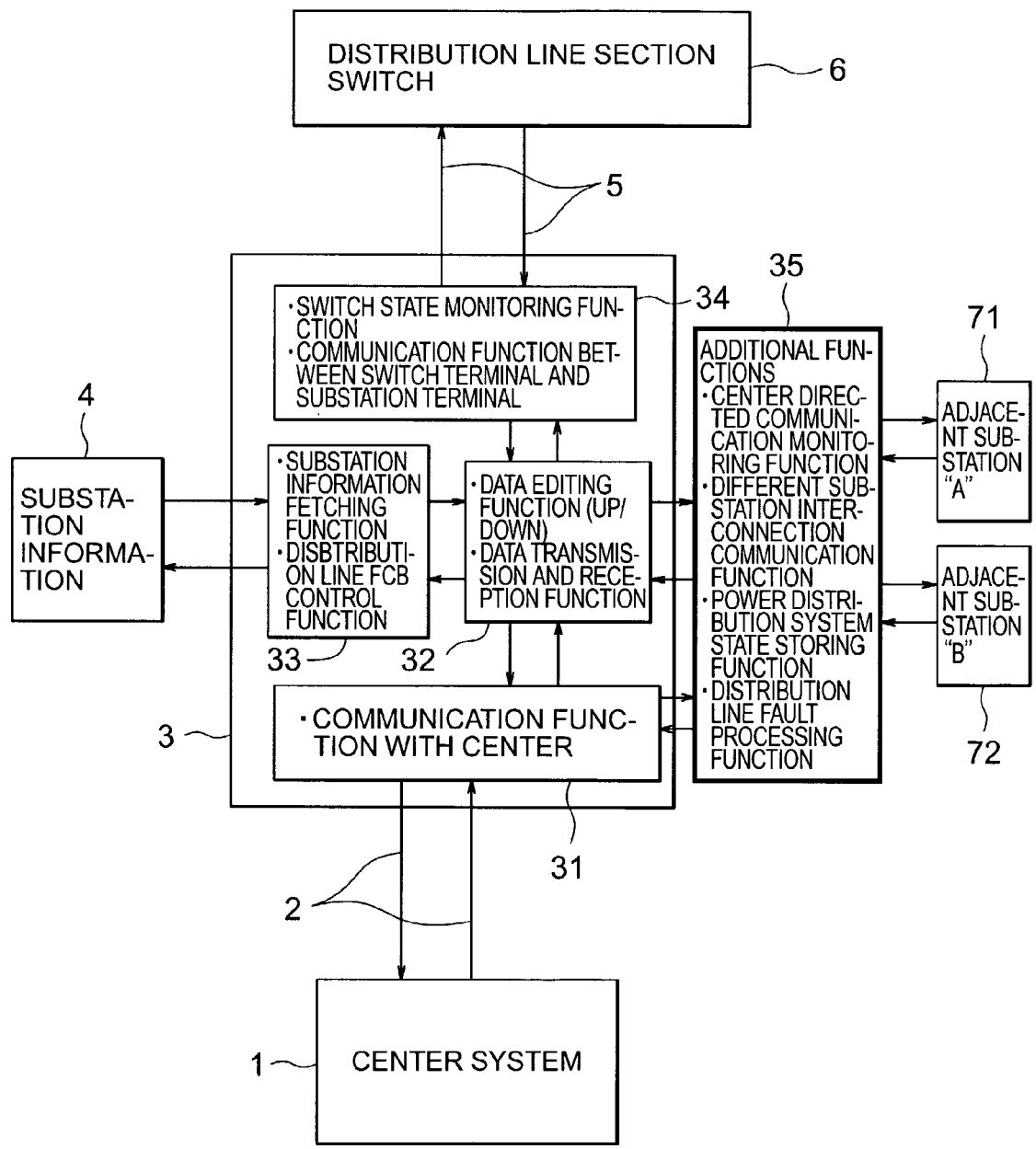
FIG. 10 is an explanatory drawing showing a functional construction in the case where, into the substation terminal, there is embedded a function of performing the fault processing on the substation terminal side when there occurs an abnormality to the communication between the substation and the main system, substitute system, and center on the center side of the monitoring and control system according to the fifth embodiment of the present invention.

FIG. 10 is an explanatory drawing of the flow of information in FIG. 9. In the case where distribution line fault processing is performed, the additional function 35 portion becomes capable of processing data in a wide range.

Figure 11:
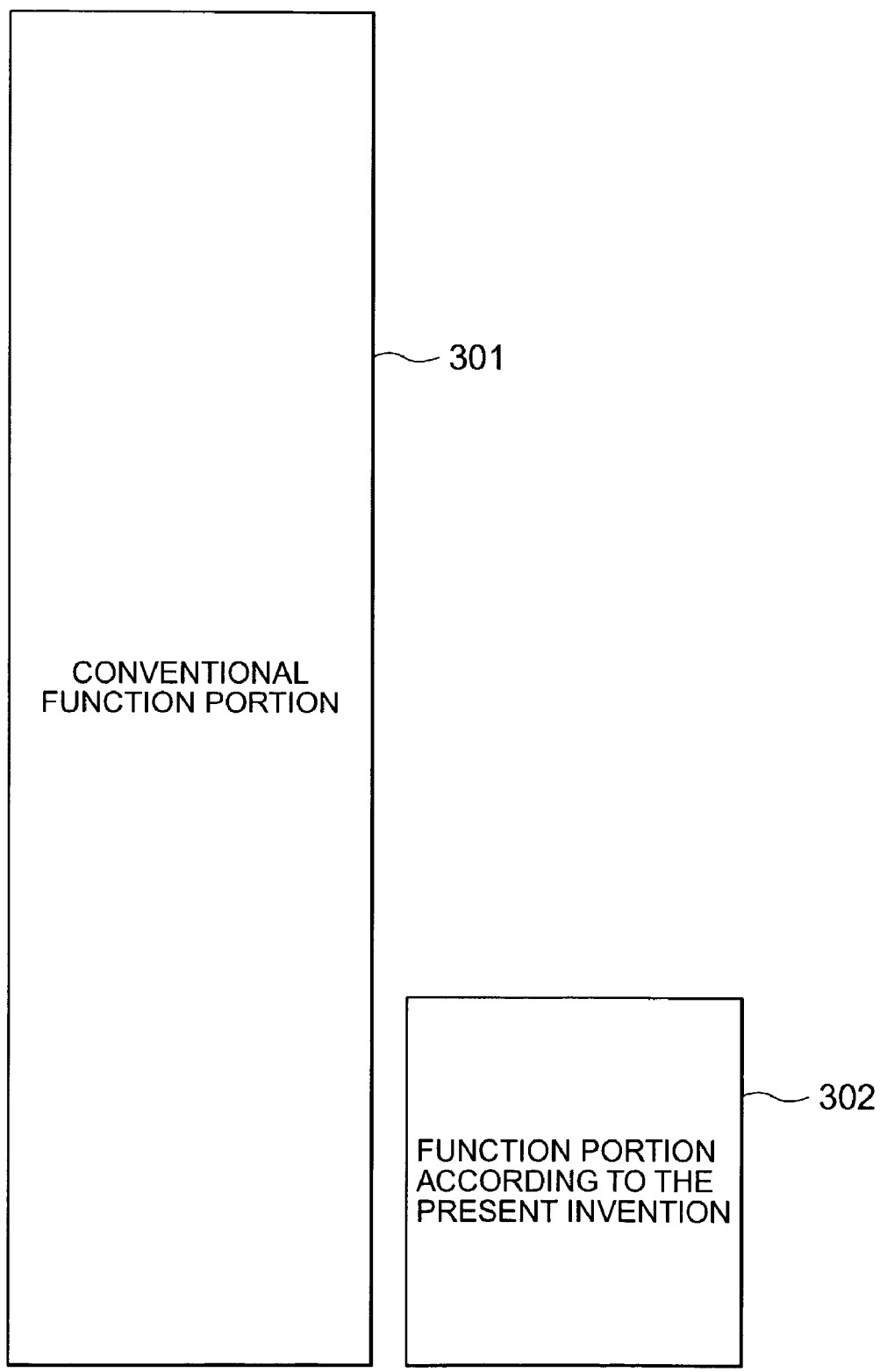
FIG. 11 is an outside drawing showing a construction in the case where, into the substation terminal, there is embedded a function of performing the fault processing on the substation terminal side when there occurs an abnormality to the communication between the substation and the main system, substitute system, and center on the center side of the monitoring and control system according to the fifth embodiment of the present invention.

FIG. 11 is the outside drawing of a construction according to the present invention. As shown in this drawing, the conventional function portion 301 shown in FIG. 17 and the additional function portion 302 according to the present invention are separately placed. With this construction, there is realized a feature that in the case where there is enhanced a function that is realized only with the conventional function portion 301 at the start of operation of a power distribution automation system, it becomes possible to shorten a time taken by the modification of the conventional function portion 301.

As described above, with the system construction of the automatic monitoring and control system according to this embodiment, each substation terminal is given the simple type substitute center function that is capable of performing its own monitoring and control even in the case where a center system loses all of its functions. As a result, there is obtained an effect that it becomes possible to perform processing for coping with all distribution line faults, to improve the service provided for each consumer, and to provide a system with high reliability.

Fourth Embodiment

Figure 12:
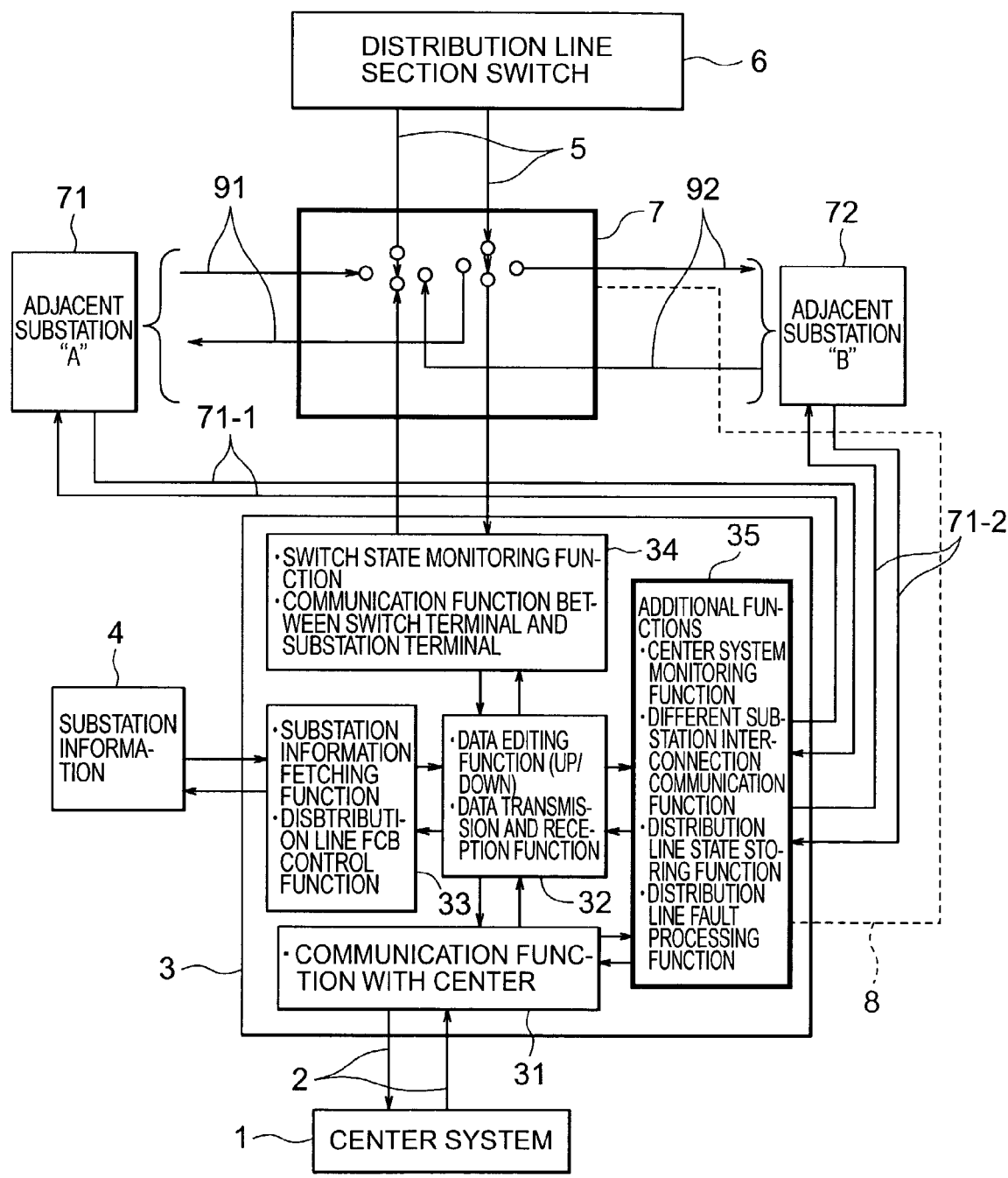
FIG. 12 is a construction drawing showing switching of communication lines from a substation terminal to a switch terminal unit in the monitoring and control system according to the first to fifth embodiments of the present invention, with different substation interconnection in this system being also shown.

In this embodiment, there will be described the construction of the different substation interconnection explained in the first to third embodiments described above. FIG. 12 is a drawing explaining a method of establishing interconnection with a different substation. In FIG. 12, reference numeral 7 denotes a channel switching device, numeral 8 indicated by a dotted line denotes a switch control command line that, in the case where a monitoring abnormality is detected with the monitoring function (including the monitoring of communication between the substation terminal and the center system) of the center system 1 among the additional functions 35, performs the switching of communication channels directed toward the switch terminal unit of the channel switching device 7.

Reference numeral 91 represents information fetching lines of the switch terminal unit to an adjacent substation A71 and numeral 92 denotes information fetching lines of the switch terminal unit to an adjacent substation B72.

Reference numeral 71-1 denotes information interconnection lines between the adjacent substation A71 and the substation terminal, while numeral 71-2 represents information interconnection lines between the adjacent substation B72 and the substation terminal. These information interconnection lines are connected at all times and are made so that data of a distribution line state storing function portion of the additional function portion 35 (the on/off state of each switch, for instance) is always updated by information on the adjacent substation A71 side and the adjacent substation B72 side.

Next, how the different substation interconnection operates will be described. When an abnormality is detected in a communication line 2, an abnormality is detected at the communication function portion 31 with the center system 1, the monitoring function portion of the center system of the additional function portion 35 starts its operation, the fetching of open-close information from the switching command line 8 to the switching device 7 is switched to the adjacent substation A71 side (or to the adjacent substation B72 side) It is assumed that whether the switching is performed to the substation A71 side or to the substation B72 side is set in advance.

The adjacent substations A71 and B72 each fetch information concerning the party on the other end through the information interconnection lines 71-1 and 71-2 at all times and the adjacent substation A71 side receives a command from the center system 1, thereby making it possible to perform necessary switch control.

A result of the control from the adjacent substation A71 is transmitted from the adjacent substation A terminal to the center system and is fetched into the distribution line state storing function portion of the additional functions 35 through the information interconnection line 71-1. The information fetched here is also transmitted to the adjacent substation B72 through the information interconnection line 71-2. This information will become necessary to perform the control from the substation terminal in FIG. 12 in the case where the center system on the adjacent substation A side loses its functions.

As described above, each substation terminal exchanges information through the information interconnection lines 71-1, 71-2, . . . , the center system and each substation terminal possess the switch state of the same distribution line, and the switch control is performed, so that there occurs no contradiction. As a result, it becomes possible to perform control with high reliability.

Figure 13:
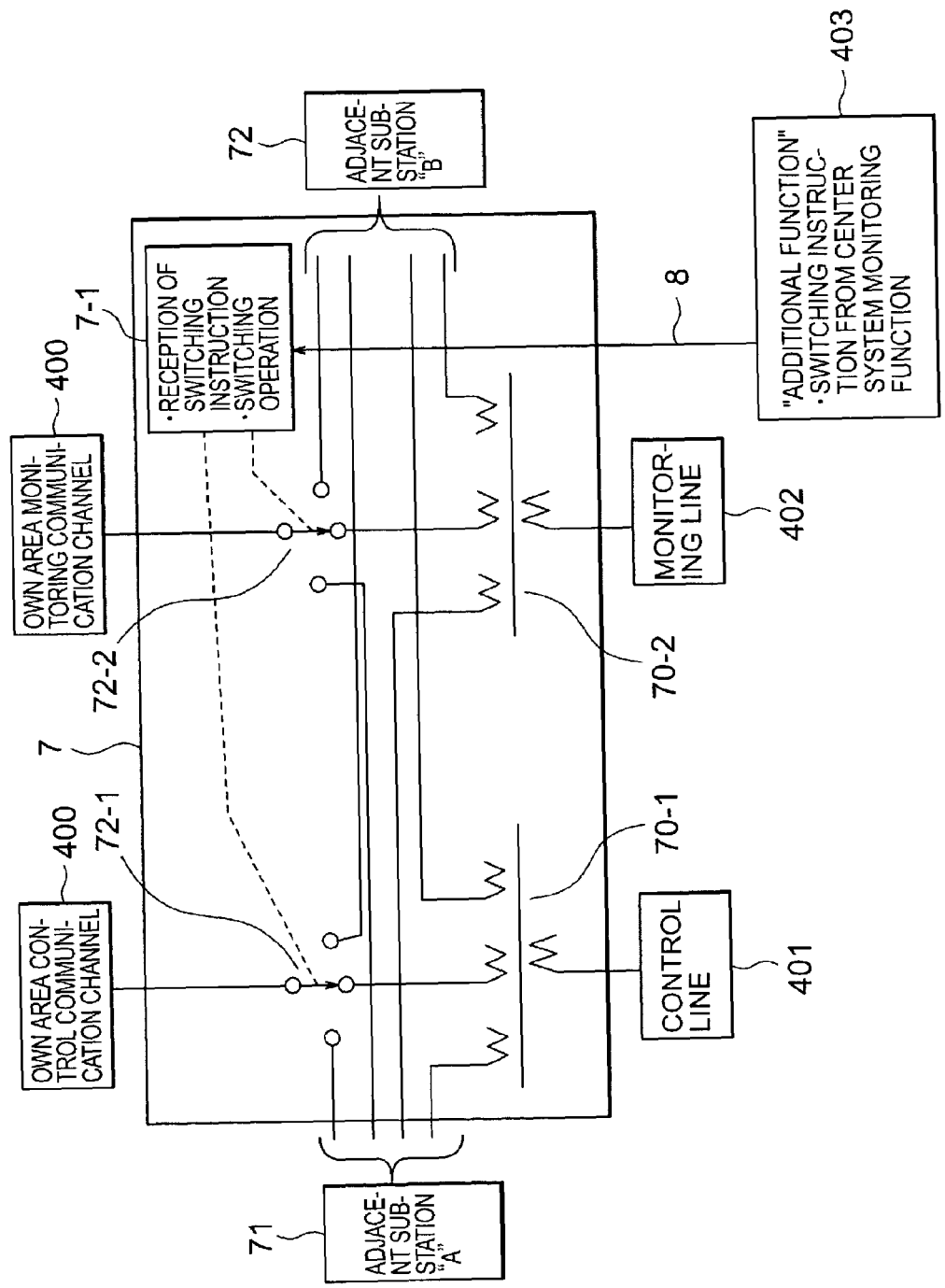
FIG. 13 is an explanatory drawing showing the switching of communication lines from a substation terminal to a switch terminal unit in the monitoring and control system according to the first to fifth embodiments of the present invention.

FIG. 13 is an explanatory drawing of means for performing the switching of the communication line 5 directed toward a switch using the switch command line 8 and the switching device 7. Construction elements 70-1 and 70-2 suppress an external surge using an insulation transformer and maintain the stability of a potential between different substations. Reference numerals 72-1 and 72-2 represent changeover switches that switch information of the switch terminal unit toward its own area transforming terminal and the adjacent substations A and B. Numeral 7-1 denotes switching command reception and a switching operation, numeral 400 denotes an own area control communication line for switch terminal unit, numeral 401 denotes a control line for self substation terminal, numeral 402 denotes a monitoring line for self substation terminal, and numeral 403 denotes a switching command from the center system monitoring function for self substation terminal.

In FIG. 13, in the case where the center system is placed in an abnormal state, a command issued by the center system is received from the substation A71 side. In the case where the switch in an own area is controlled, the changeover switches 72-1 and 72-2 are each connected to the right side, thereby performing control and monitoring.

Fifth Embodiment

In this embodiment, there will be described a case where the center system loses its functions in the first to third embodiments described above. As to the loss of the functions of the center system, in the case where the communication line is judged as "OK" by the communication function with the center and each substation terminal obtains information concerning the loss of the functions of the center system or in the case where a plurality of substation terminals detect an abnormality of communication with the center, it is judged that the functions of the center system are lost.

In this case, each substation terminal is provided with a capability to perform the switch control. As a result, in the case where the functions of the center system are lost, the power distribution fault processing function portion of the additional functions in FIG. 12 realizes the lost functions.

In FIG. 12, the state of each distribution line is fetched using the information interconnection lines 71-1, 71-2, . . . between respective substations at all times and there is possessed the distribution line fault processing function among the additional functions. As a result, there is obtained a feature that in the case where the center system is downed, it becomes possible to perform the switch control in an own area in a self-reliant manner.

In FIG. 12, it is possible to perform the fault processing in an own area using a substation terminal in the area and each adjacent substation carries out by itself the processing for coping with a fault occurring to the adjacent substation.

With the present invention, there is provided a monitoring and control system including a center main system that monitors and controls at least one substation, a distribution line connected to the substation, a switch provided on the distribution line, and a substation terminal that is provided for the substation and performs monitoring and control of the switch, where the monitoring and control system has different substation terminal interconnection means that is provided for each substation terminal and, if an abnormality occurs to a communication channel that connects the substation terminal to the center main system, performs switching of communication channels so that a different substation terminal performs interconnection and communication with the center main system instead of the substation terminal, and the center main system monitors and controls the switch that is a monitoring target of the substation terminal connected to the communication channel, to which the abnormality occurs, through the different substation terminal that has received the instruction. With this construction, it becomes possible to perform monitoring and control with high reliability.

Also, the different substation terminal interconnection command means is provided separately from the transforming terminal. With this construction, it becomes possible to further enhance the reliability.

Also, the monitoring and control system further includes a fault processing means, which is provided for each substation terminal, stores information concerning a switch that is a monitoring target of an own substation and information concerning a switch that is a monitoring target of a different substation, and, if an abnormality occurs to a communication channel connecting a different substation terminal to the center main system, performs processing for coping with a distribution line fault occurring at the different substation instead of the different substation. With this construction, it becomes possible to further enhance the reliability.

With the present invention, there is also provided a monitoring and control system including a center main system that monitors and control at least one substation, a distribution line connected to the substation, a switch provided on the distribution line, and a substation terminal that is provided for the substation and performs monitoring and control of the switch, where the monitoring and control system has a substitute center means that is provided for each substation terminal and, if the center main system is stopped, performs monitoring and control of the switch that is a monitoring target of the substation instead of the center main system. With this construction, it becomes possible to perform monitoring and control with high reliability.

What is claimed is:

1. A monitoring and control system including:
   a first center main system that monitors and controls first and second substations;
   first and second distribution lines connected to the first and second substations, respectively;
   first and second switches in the first and second distribution lines, respectively;
   first and second substation terminals for the first and second substations, respectively, that monitor and control the first and second switches, respectively;
   first and second communication channels providing communication between the first center main system and the first and second substation terminals, respectively;
   an inter-substation communication channel providing communication between the first and second substation terminals; and
   substation terminal interconnection means providing a communication channel between the first substation terminal and the first center main system, upon failure of the first communication channel, through the inter-substation communication channel, the second substation terminal, and the second communication channel, so that the first center main system monitors and controls the first switch.

2. The monitoring and control system according to claim 1, wherein the substation terminal interconnection means is located outside the second substation terminal.

3. The monitoring and control system according to claim 1, wherein the substation terminal interconnection means is part of the second substation terminal.

4. The monitoring and control system according to claim 1, wherein the second substation terminal comprises fault processing means storing information for the first and second switches and, upon failure of the first communication channel, responding to a distribution line fault in the first distribution line.

5. The monitoring and control system according to claim 1 including a second center main system and a communication channel switching device interconnecting the first and second communication channels and the first and second center main systems for switching the first and second communication channels to the second center main system upon failure of the first center main system.

6. A monitoring and control system including:
   a first center main system that monitors and controls a plurality of substations;
   respective distribution lines connected to corresponding substations;
   respective switches in the corresponding distribution lines;
   respective substation terminals, each terminal being provided for a respective substation and monitoring and controlling the corresponding switch for the respective substation;
   respective communication channels providing communication between the first center main system and the respective substation terminals;

inter-substation communication channels respectively providing communication between each respective substation and two other substations; and substation terminal interconnection means, provided for each substation terminal, for providing communication between a first of the substation terminals and the first center main system upon failure of the communication channel between the first center main system and the first of the substation terminals, through a second of the substation terminals that is connected to the first of the substation terminals, through the inter-substation communication channel connecting the first and second of the substation terminals and the communication channel between the first center main system and the second of the substation terminals, so that the first center main system monitors and controls the switch associated with the first of the substation terminals.

7. The monitoring and control system according to claim 6, wherein the respective substation terminal interconnection means for each of the substation terminals is part of the respective substation terminals.

8. The monitoring and control system according to claim 6, wherein the respective substation terminal interconnection means for each of the substation terminals is outside of the respective substation terminals.

9. The monitoring and control system according to claim 6, wherein each substation terminal comprises fault processing means storing information concerning the corresponding switch monitored by the respective substation terminal and information concerning the switches monitored by the substation terminals connected to the respective substation terminal by the inter-substation communication channel and, upon failure of the communication channel between the first center main system and a first of the substation terminals connected to the respective substation terminal by the inter-substation communication first of the substation terminals connected by the inter-substation communication channels to the respective substation terminal.

10. The monitoring and control system according to claim 6 including a second center main system and a communication channel switching device interconnecting the first and second communication channels and the first and second center main systems for switching the first and second communication channels to the second center main system upon failure of the first center main system.

* * * * *